United States Patent [19]

Marois

[11] Patent Number: 5,444,884
[45] Date of Patent: Aug. 29, 1995

[54] CONTROLLING SCREEN BACKFLUSH AND WASH DISTRIBUTION IN A PRESSURE DIFFUSER

[75] Inventor: Marco F. Marois, Queensbury, N.Y.

[73] Assignee: Kamyr, Inc., Glens Falls, N.Y.

[21] Appl. No.: 275,875

[22] Filed: Jul. 15, 1994

[51] Int. Cl.[6] .............................................. D21D 5/04
[52] U.S. Cl. .................... 8/156; 68/181 R; 162/60; 210/393
[58] Field of Search ........................ 8/156; 68/181 R; 162/60, 251; 210/388, 389, 393, 411

[56] References Cited

U.S. PATENT DOCUMENTS

| | | | |
|---|---|---|---|
| 4,368,628 | 1/1983 | Jacobsen | 68/181 |
| 4,396,509 | 8/1983 | Foyn | 210/315 |
| 4,535,497 | 8/1985 | Jacobsen | 8/156 |
| 4,908,896 | 3/1990 | Jacobsen et al. | 8/156 |
| 4,944,167 | 7/1990 | Jacobsen et al. | 68/181 R |
| 5,020,178 | 6/1991 | Jacobsen | 8/156 |
| 5,044,179 | 9/1991 | Jacobsen | 68/181 R |
| 5,116,476 | 5/1992 | Phillips et al. | 162/60 |
| 5,187,956 | 2/1993 | Phillips et al. | 68/181 R |

OTHER PUBLICATIONS

Publication KGD 1816–MES591 of Kamyr, Inc. entitled: *Pressure Diffuser*, 1991.

*Primary Examiner*—Philip R. Coe
*Attorney, Agent, or Firm*—Nixon & Vanderhye

[57] ABSTRACT

A pressure diffuser is constructed so that the compression of pulp that normally occurs during rapid movement of the screen assembly does not significantly degrade the efficiency of the washing (or other treatment liquid) action in the diffuser. This is accomplished by providing at least two headers, including a first vertical header and flow control assembly for one or more sets of horizontal treatment liquid conduits adjacent the pulp inlet to the diffuser, and a second vertical header and flow control assembly for one or more horizontal treatment liquid conduits remote from the pulp inlet. The first and second vertical headers may comprise a common pipe with a flow preventer precluding flow between them, or distinct pipes supplied with treatment liquid by a common pump. The advantageous results are further achieved by providing at least one ring [mounted between the outer screen and the concentric inner support cylinder of the screen assembly] with a plurality of rapid-flow restricting openings. The ring prevents backflushing liquid from moving from the pulp compression area to contaminate other areas. The ring may comprise a plurality of semi-circular ring segments mounted together in liquid tight relationship. The rapid-flow restricting openings in the ring may comprise fixed or adjustable rounded surface orifices, bevel edged orifices, sharp-edged orifices, slots, openings with check valves allowing flow only in the second direction and one or more adjacent bleed orifices, or combinations.

20 Claims, 5 Drawing Sheets

CONTROLLING SCREEN BACKFLUSH AND WASH DISTRIBUTION IN A PRESSURE DIFFUSER

BACKGROUND AND SUMMARY OF THE INVENTION

In conventional pressure diffusers, for washing or otherwise treating with treatment liquid cellulosic (paper) pulp, such as sold by Kamyr, Inc. of Glens Falls, N.Y. under the trademark MC, or in other pressure diffusers, such as those shown in U.S. Pat. Nos. 4,944,167 and 5,187,956, a screen assembly is moved slowly (at approximately the same speed of movement as the pulp) in the direction of pulp flow until it reaches the end of its stroke in a first direction, and then it is moved rapidly (i.e. at least four times more quickly than in the first direction, typically more than ten times more quickly) in a second, opposite, direction in order to cause [in conjunction with the conical geometry of the screen assembly] backflushing of the perforated screen outer surface of the screen assembly to prevent it from being clogged. In order to obtain optimum washing efficiency it is intended that the liquid backflushing the pulp at any particular area be liquid withdrawn from the pulp at that same area. Though conventional pressure diffusers exhibit excellent washing efficiency, the distribution of the backflush can be further optimized such that pressure diffuser washing efficiency and ease of operation can be improved further.

In conventional pressure diffusers, during rapid backstroking of the screen assembly (typically downstroking), pulp adjacent the pulp inlet is compressed by screen assembly components. This compression prevents backflushing liquid at the compressed area so from flowing through the screen into the pulp, and instead causes this liquid—which is typically the "dirtiest" liquid in the pressure diffuser—to flow toward the pulp outlet until it moves past the compressed area, and then into relatively clean pulp thereat. This compression also restricts the flow of clean treatment (typically wash) liquid into the annulus between the interior surface of the pressure vessel and the exterior surface of the screen; the liquid is typically introduced through "wash baffles." This causes restrictions, channeling, and reduced flow into the compressed area, causing undesired thickening adjacent the pulp inlet, and causes more wash liquid than desired to flow into other areas of the pressure vessel, causing undesired dilution.

The invention alleviates both of the above-described drawbacks. According to the first aspect of the invention, the flow of fresh wash liquid is normalized during rapid backstroking of the screen assembly by providing separate headers and flow controls for supplying wash liquid to the compressed pulp area and other areas of the vessel. According to a second aspect of the invention, flow of dirty backflushing liquid to cleaner volumes of pulp is restricted, and instead, the backflushing liquid is caused to perform its desired screen-backflushing function at the compressed pulp area (from which it was originally removed). While the aspects of the invention may be used individually, they are preferably used together, and complement each other and optimize the efficiency of the system. Both aspects may be readily retrofit to existing installations, or incorporated in new installations, and are simple.

According to the first aspect of the invention, a pressure diffuser assembly is provided comprising the following elements. A superatmospheric pressure vessel elongated in a dimension of elongation, and having an inner wall, an inlet and an outlet for pulp, so an outlet for withdrawn liquid, and a plurality of inlets for treatment liquid along the dimension of elongation thereof. A screen assembly mounted within the vessel and defining a pulp flow annulus between an exterior surface thereof and the inner vessel wall, pulp flowing from the inlet to the outlet through the annulus generally in a first direction along the dimension of elongation, and defining an interior withdrawn liquid volume communicating with the outlet for withdrawn liquid. Means for moving the screen assembly for slow movement in the first direction along the dimension of elongation, and for rapid, backflushing, movement in a second direction, opposite the first direction, rapid movement in the second direction causing pulp compression adjacent the pulp inlet. And means for providing continued substantially constant volume flow of treatment liquid through the inlets for treatment liquid, including treatment liquid inlets adjacent the pulp inlet, despite compression of the pulp caused by rapid movement of the screen assembly in the second direction.

Preferably, a plurality of sets of horizontal treatment liquid conduits are connected to the inlets along the dimension of elongation, and at least one vertical header is connected to the conduits. In this case, the means for providing continued substantially constant volume flow of treatment liquid through the inlets comprises a first vertical header and flow control assembly for one or more sets of horizontal treatment liquid conduits adjacent the pulp inlet, and at least a second vertical header and flow control assembly for one or more horizontal treatment liquid conduits remote from the pulp inlet. The vertical headers (e.g., first and second headers) may comprise a common pipe with an isolation device precluding flow between them, or the vertical headers may comprise distinct pipes supplied with treatment liquid by a common pump.

Each of the flow control assemblies preferably comprises a flow so element operatively connected to a flow control valve. Each of the headers preferably comprises at least two branches spaced circumferentially around the superatmospheric pressure vessel, and a common pump supplies treatment liquid to the first and second vertical headers. The headers may be fed by individual pumps.

According to the first aspect of the invention, a method of operating a pressure diffuser assembly for treating cellulosic pulp with a treatment liquid is provided. The assembly includes: a superatmospheric pressure vessel elongated in a dimension of elongation, and having an inner wall, an inlet and an outlet for pulp, an outlet for withdrawn liquid, and a plurality of inlets for treatment liquid along the dimension of elongation thereof; a screen assembly mounted within the vessel and defining a pulp flow annulus between an exterior surface thereof and the inner vessel wall, pulp flowing from the inlet to the outlet through the annulus generally in a first direction along the dimension of elongation, and defining an interior withdrawn liquid volume communicating with the outlet for withdrawn liquid; and means for moving the screen assembly for slow movement in the first direction along the dimension of elongation, and for rapid, backflushing, movement in a second direction, opposite the first direction, rapid movement in the second direction causing pulp compression adjacent the pulp inlet. The method comprises the step of (a) providing continued substantially constant volume flow of treatment liquid through the inlets for treatment liquid, including treatment liquid inlets adjacent the pulp inlet, despite compression of the pulp caused by rapid movement of the screen assembly in the second direction.

Step (a) is typically practiced by supplying treatment liquid to both the first and second vertical headers, separately controlled by the flow control assemblies associated therewith. There is also preferably the further step (b) of distributing liquid from a common pump to the flow control assemblies associated with the first and second vertical headers, steps (a) and (b) preventing undesired thickening of pulp adjacent the pulp inlet.

According to the second aspect of the present invention, a pressure diffuser assembly is provided comprising the following components: A superatmospheric pressure vessel elongated in a dimension of elongation, and having an inner wall, an inlet and an outlet for pulp, an outlet for withdrawn liquid, and a plurality of inlets for treatment liquid along the dimension of elongation thereof. A screen assembly mounted within the vessel and defining a pulp flow annulus between an exterior surface thereof and the inner vessel wall, pulp flowing from the inlet to the outlet through the annulus generally in a first direction along the dimension of elongation, and defining an interior withdrawn liquid volume communicating with the outlet for withdrawn liquid. The screen assembly includes an outer perforated screen and a concentric inner screen support cylinder radially spaced from the outer perforated screen. Means for moving the screen assembly for slow movement in the first direction along the dimension of elongation, and for rapid, backflushing, movement in a second direction, opposite the first direction, rapid movement in the second direction causing pulp compression in a pulp compression area adjacent the pulp inlet and tending to cause backflushing of withdrawn liquid from the screen assembly adjacent the pulp inlet through a portion of the screen assembly past the pulp compression area in the first direction. And one or more rings mounted between the outer perforated screen and the concentric inner screen support cylinder and having a plurality of rapid-flow restricting openings therein. A ring with flow restricting openings substantially prevents backflushing liquid from moving from the pulp compression area to areas past the pulp compression area in the first direction.

A ring preferably comprises a plurality of generally semi-circular segments mounted together in substantially liquid tight relationship. A ring has an outside diameter substantially the same as or slightly less than the inside diameter of the outer perforated screen, and an inside diameter substantially the same as or slightly more than the outside diameter of the inner support cylinder, so that the ring is held in liquid tight engagement between the outer perforated screen and the inner support cylinder.

The rapid-flow restricting openings in a ring may comprise fixed or adjustable: rounded surface orifices, bevel-edged orifices, sharp-edged orifices, slots, openings with check valves allowing flow only in the second direction and one or more adjacent bleed orifices, or combinations thereof. The ring may have between about 8–90 rapid-flow restricting openings and a thickness of about 0.125–2 inches. Where at least some of the rapid-flow restricting openings comprise fixed rounded surface orifices, they preferably have a first end with a diameter of about 0.5–8 (preferably 2–4) inches and a second end, downstream of the first end in the second direction, of about 0.5–3 (preferably 0.5–1.5) inches with a smooth and curved wall therebetween.

It is the primary object of the present invention to provide a pressure diffuser assembly, and method of operation, optimizing washing (treatment) efficiency in a simple yet effective manner, which can be employed in existing installations and new constructions. This and other objects will become clear from an inspection of the detailed description of the invention, and from the appended claims.

DETAILED DESCRIPTION OF THE DRAWINGS

Figure 1:
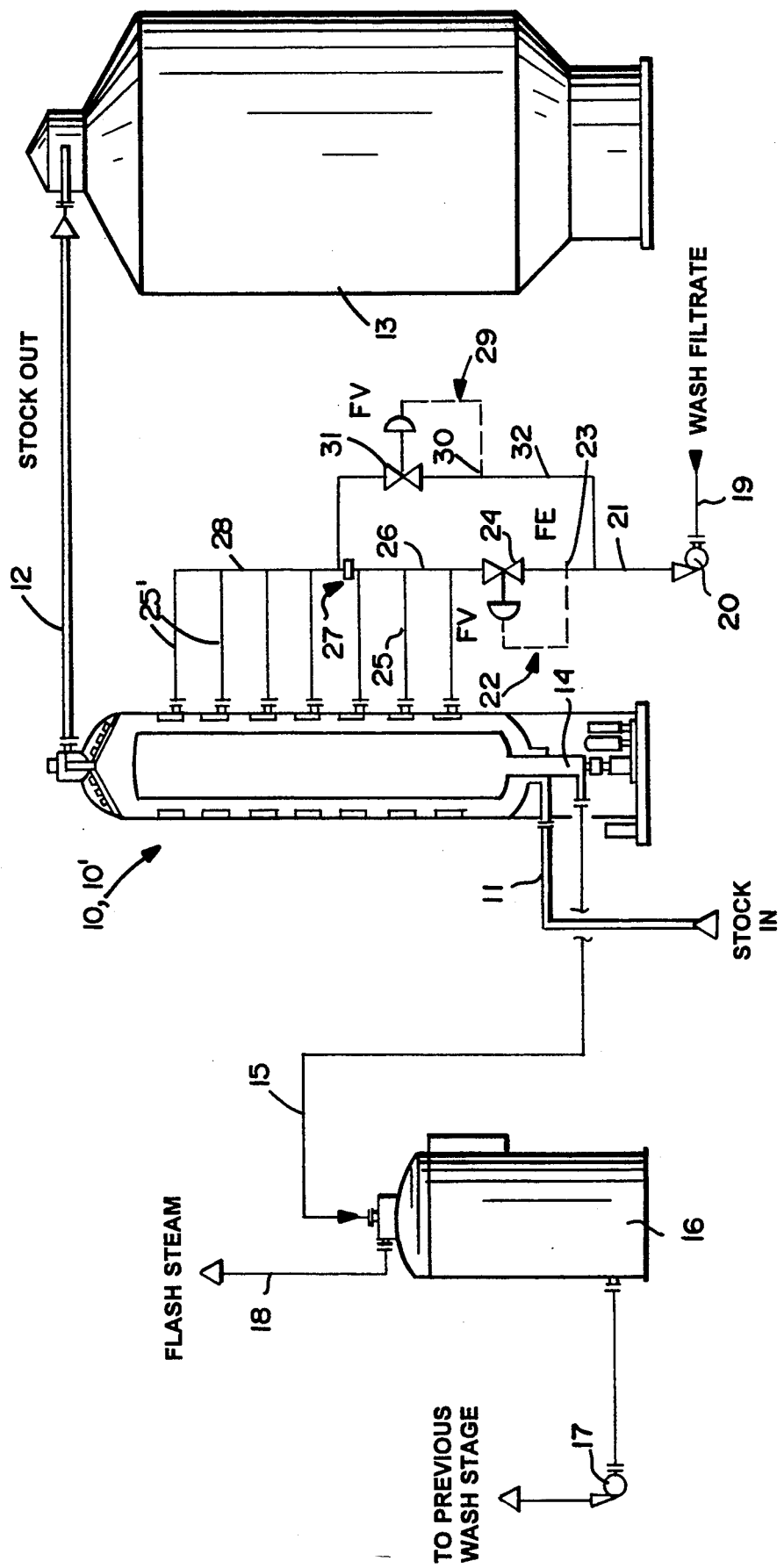
FIG. 1 is a schematic view of an exemplary pressure diffuser assembly, and associated components, for washing cellulosic pulp, according to the present invention.

FIG. 1 illustrates an exemplary pressure diffuser assembly according to the first aspect of the present invention. A superatmospheric pressure diffuser vessel—which may be a vessel 10 (see FIG. 3) of conventional construction, or a superatmospheric pressure vessel 10' (see FIG. 4) according to the invention, is supplied with low or medium consistency cellulosic pulp through pulp inlet 11, and treated (typically washed) pulp is removed through outlet 12 and passes to storage tank 13. Spent treatment liquid (typically wash filtrate) is withdrawn through withdrawn liquid outlet 14 and passes in line 15 to filtrate tank 16, from which it is pumped by filtrate pump 17 to a previous wash stage. Flash steam may be removed from tank 16 as indicated by line 18 in FIG. 1.

Treatment (typically wash) liquid is supplied to the diffuser 10, 10' via line 19 by pump 20 and line 21. A flow control loop or assembly 22, which may include a flow sensing device 23 of conventional construction, such as an orifice plate, and a flow control valve 24 which is operated in response to the flow sensed at 23, is lo provided to supply a substantially constant volume of wash liquid to the diffuser 10, 10'. A plurality of sets of generally horizontal wash liquid conduits 25 supply wash liquid to the vessel 10, 10' around the circumference thereof. Each set 25 includes a plurality of conduits, typically spaced equidistant around the vessel 10, 10' at approximately the same vertical level. At least one generally vertical header 26 supplies flow-controlled wash liquid from the line 21 to the conduits 25.

In a conventional pressure diffuser assembly, the header 26 extends the entire length of the vessel 10, 10'. As a result, if flow at the lower conduits 25 should be blocked or retarded as a result of pulp compression or the like, the wash liquid will take the path of least resistance, and more liquid will be supplied to the top conduits 25 than the ones adjacent pulp inlet 11. This results in unwanted thickening of the pulp at the bottom of vessel 10, 10' (i.e. adjacent pulp inlet 11), and unwanted dilution remote from pulp inlet 11. According to the present invention, this problem is solved by providing an isolation device 27 (shown schematically in FIG. 1) —such as a solid plate or normally closed valve—between the lowermost sets of conduits 25 (i.e. those closest to the pulp inlet 11, where pulp compression is most likely to occur) and the rest of the conduits 25'. That is, the second generally vertical header 28 is provided which in normal operation is separate and distinct from the first header 26 and the conduits 25 associated therewith. Also a second flow control assembly 29 (like the assembly 22), containing the flow element 30 and flow control valve 31, is connected between pump discharge conduit 21 and header 28 for maintaining a substantially constant volume flow to the conduits 25'. In this way undesired thickening of the pulp adjacent the inlet 11, and undesired dilution of the pulp remote from inlet 11, are avoided.

Figure 2:
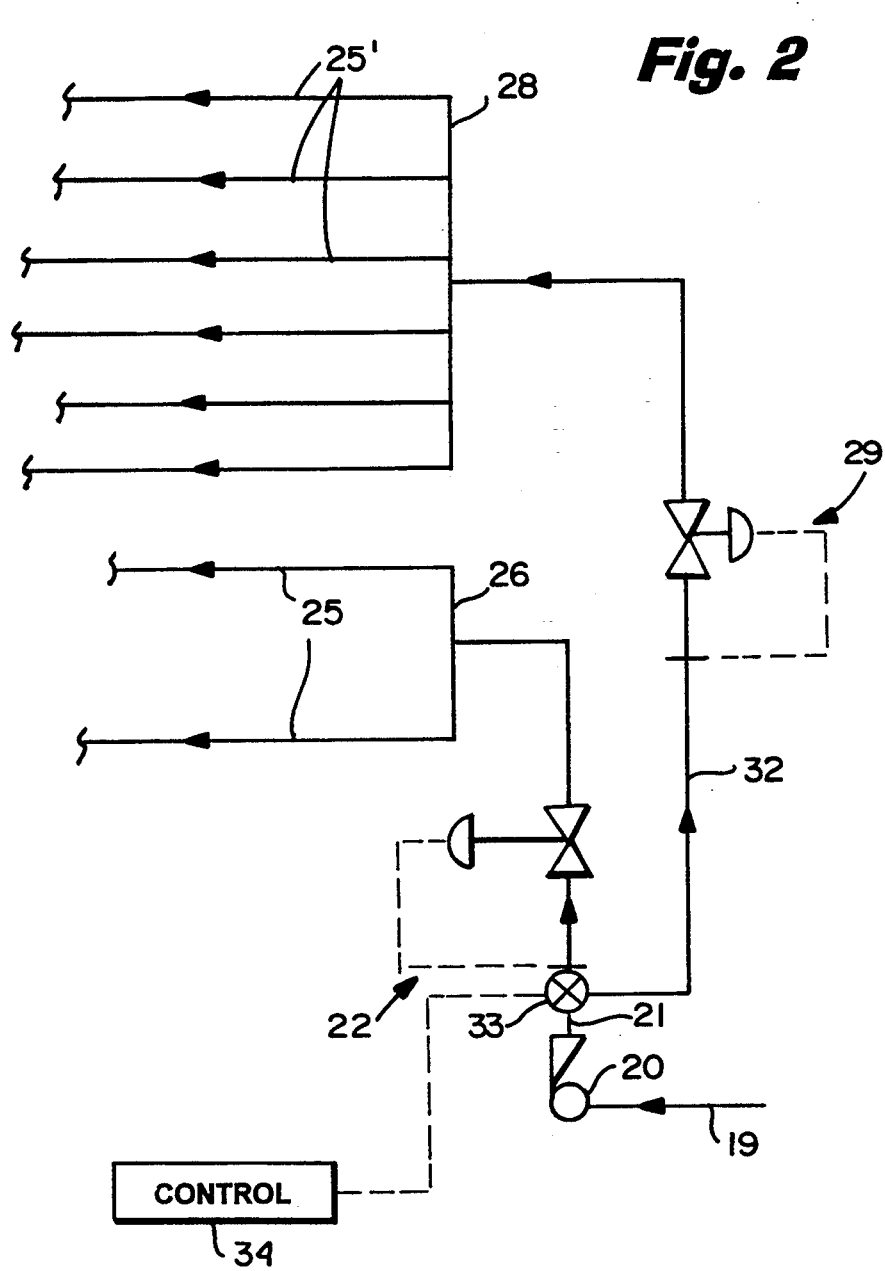
FIG. 2 is a schematic view of an alternative for the header and control components of the assembly of FIG. 1.

The embodiment of FIG. 1 is ideal for retrofits since all it requires is installation of the isolation device 27 and the addition of the flow control assembly 29 and its conduit 32 which leads from line 21 to header 28. FIG. 2 shows a modification of the assembly of FIG. 1 which would be used for some new constructions (although it could also be retrofit) in which the headers 26, 28 are completely physically separate and distinct from each other, as well as being operationally distinct. FIG. 2 also shows an entirely optional valve 33 in line 21, which valve 33 may be automatically controlled by a controller 34, for diverting the desired amount of flow to each of the headers 26, 28 so that the correct proportionate amount from pump 20 flows to each under substantially all circumstances.

While the vertical headers 26, 28 are described above as single headers, it is understood that normally a plurality of each of the headers 26, 28 are provided, i.e. at least two, circumferentially spaced around the exterior of the vessel 10, 10'. A plurality of such headers 26 are seen in FIG. 3, which illustrates the bottom of a conventional pressure diffuser 10.

Figure 3:
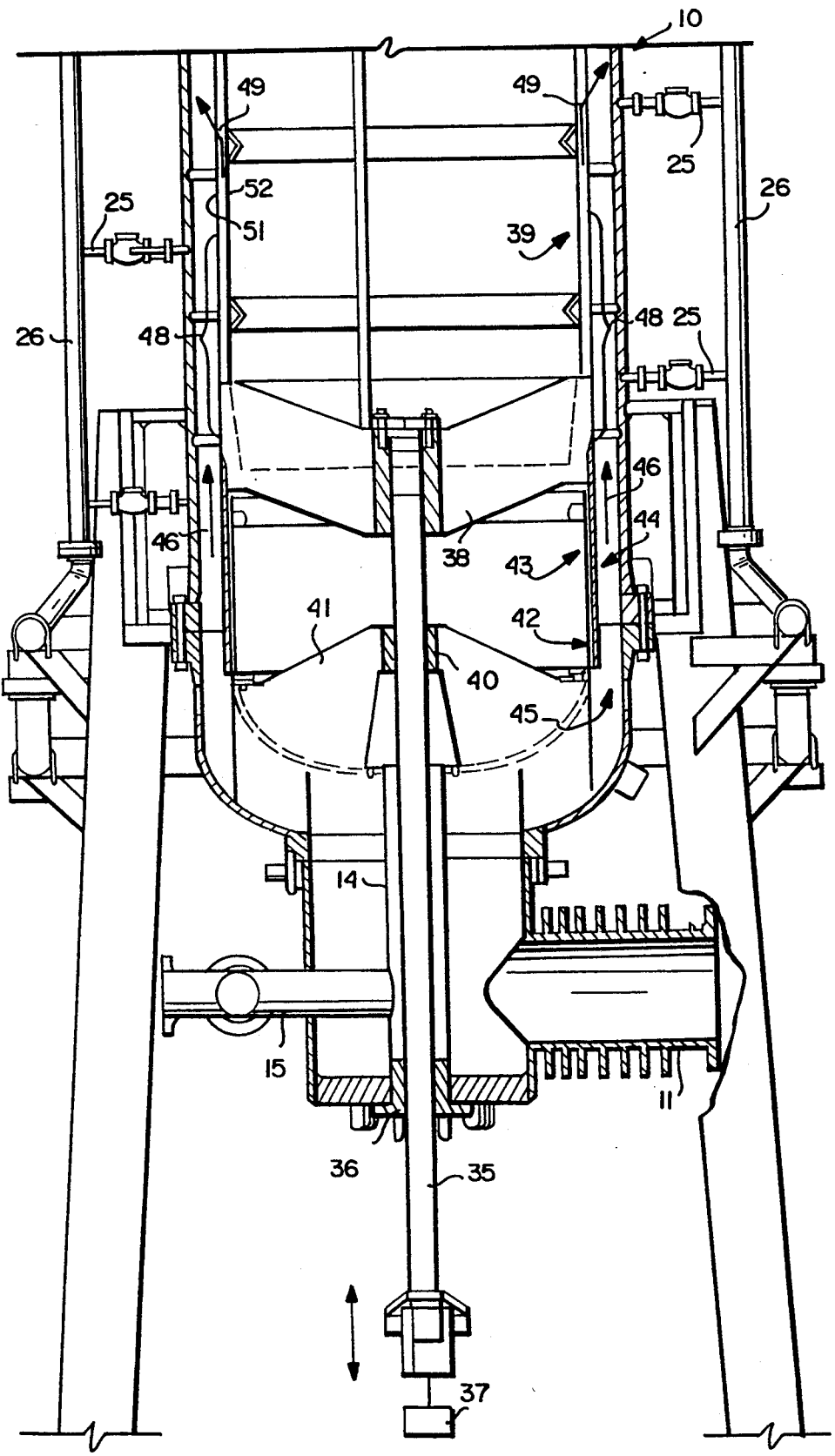
FIG. 3 is a detailed side view, partly in cross-sectional, partly in elevation, and partly schematic, of the portion of a conventional pressure diffuser adjacent the pulp inlet and withdrawn liquid outlet thereof, schematically illustrating pulp compaction which results in contaminating backflushing liquid flow.

As seen in FIG. 3, a conventional diffuser 10 has a shaft 35 which is linearly reciprocated—typically up and down—sliding in bearing 36, and under the control of means 37 for moving a conventional screen assembly 39—to which it is connected by spider 38—for slow movement in a first direction along the dimension of elongation of the vessel 10, and for rapid, backflushing, movement in a second direction, opposite the first direction. The means 37 typically is a hydraulic cylinder. The first direction is the direction of pulp movement, from the inlet 11 to the outlet 12. The slow movement is typically at the same rate as the speed of the pulp moving in the annulus between the screen assembly 39 and the interior wall of the vessel 10. The rapid movement in the second direction is at least four times the speed of the movement in the first direction, and typically is at least ten times as great. Movement in the second direction causes pulp compression adjacent the pulp inlet 11.

Movement of shaft 35 is also guided by bearing 40, with the spider 41 supporting the bearing 40. The screen bearing, 42, which is attached to and moves with the screen assembly 39 engages the bearing cylinder 43. The lower screen support cylinder 44 supports the screen bearing 42, and is thrust into the pulp bed 45 during rapid downward movement of the shaft 35 and attached screen assembly 39. Since the vessel 10 is full, this causes compression of the pulp in the direction of arrow 46. The compressed pulp not only restricts the flow of wash liquid through the conduits 25, but restricts the flow of backflushing liquid through the screen area 48 (adjacent the pulp inlet 11) and forces backflushing liquid to follow the path approximately indicated by arrows 49. That is, the dirtiest backflushing liquid, at the area 48, does not backflush the screen area 48 as desired, but rather contaminates the cleaner pulp above the area 48, and more remote from the pulp inlet 11, the liquid 49 flowing in the annular space between the outer perforated screen 51 and the concentric, inner screen support cylinder 52.

Figure 4:
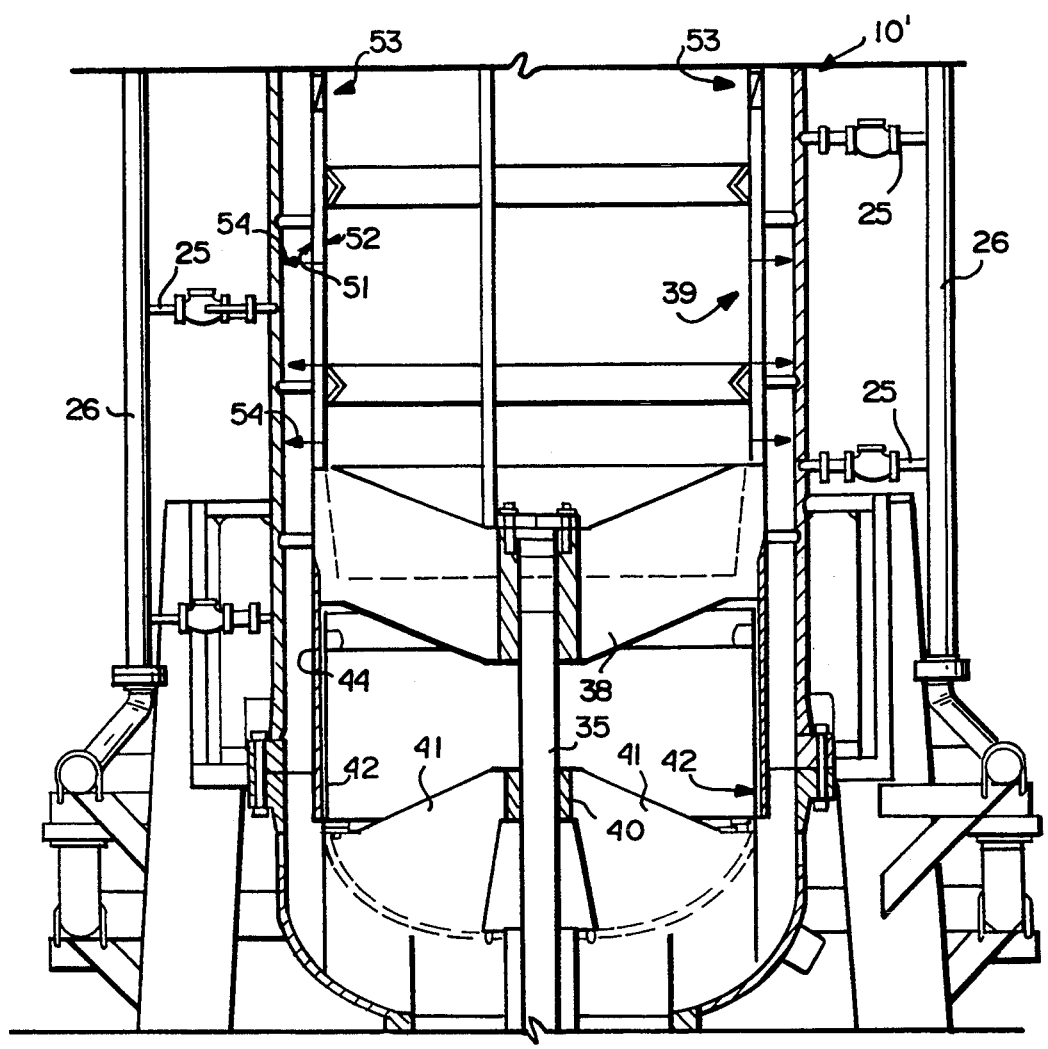
FIG. 4 is a view like that of FIG. 3 only of a pressure diffuser according to the present invention.

The contaminating backflushing liquid flow 49 is substantially prevented according to the present invention as by using the assembly illustrated in FIG. 4, which is the same as FIG. 3 only for the modified diffuser 10' according to the second aspect of the present invention. The diffuser 10' of FIG. 4 is different from the conventional diffuser 10 of FIG. 3 only in the provision of the ring—shown schematically at 53 in FIG. 4, and shown in more detail in FIGS. 5-9—in the annulus between the outer perforated screen 51 and the concentric, inner screen support cylinder 52. More than one ring 53 may be provided, the rings vertically spaced from each other in the annulus. Because the annulus between elements 51, 52 is hydraulically filled, the exact position of the ring 53 along the length of the screen assembly 39 is not particularly critical, however it is preferred that it be located—as illustrated in FIG. 4—just below where the flow 49 typically occurs in a conventional diffuser 10. The ring 53—as indicated by arrows 54 in FIG. 4—causes a backpressure that results in close to desired backflushing of liquid through what was the area 48 of the conventional diffuser 10 of FIG. 3.

Figure 5:
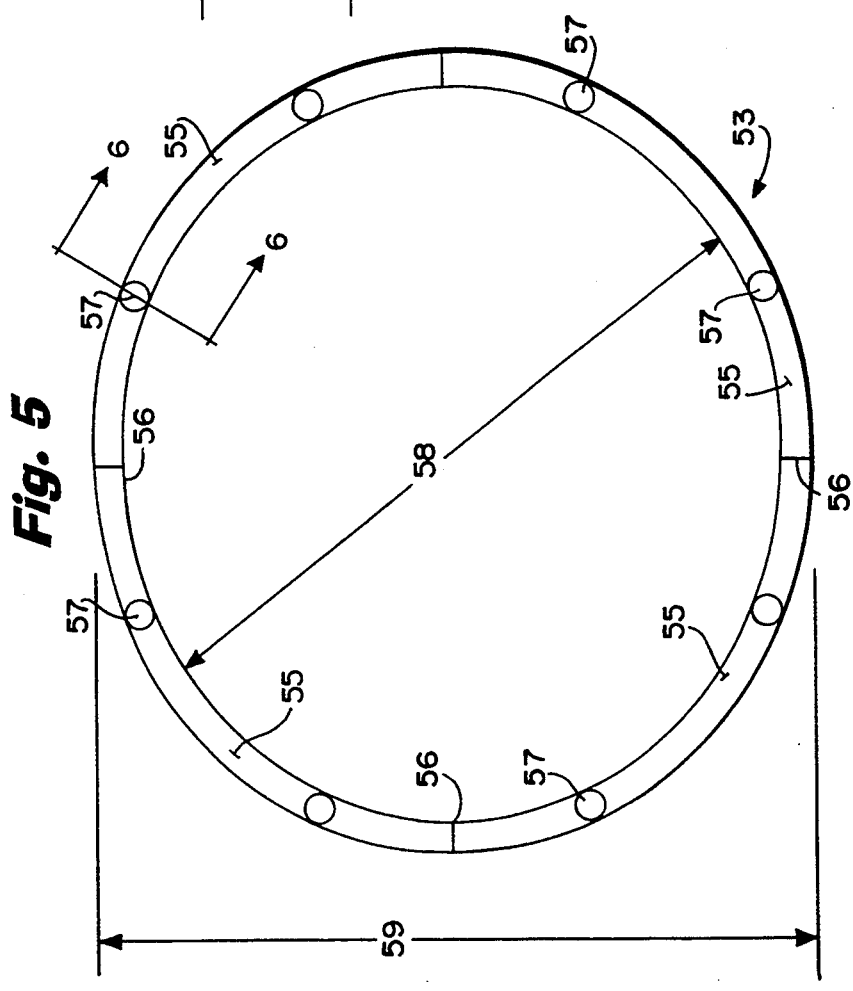
FIG. 5 is a top plan view of the contaminating-liquid flow preventing ring of the diffuser of FIG. 4.

The ring 53 preferably comprises a ring body which—for ease of fabrication and assembly—is constructed from generally semi-circular body segments 55, as seen in FIG. 5. The diffuser 10' need not be exactly circular in cross-section, i.e. it may be slightly elliptical, therefore the body segments 55 need not be precisely semi-circular. The body segments 55 are typically formed of a non-corroding metal. There are substantially liquid-tight joints 56 between the segments 55, and a plurality of rapid-flow restricting openings 57 therein. The ring 55 with flow restricting openings 57 substantially prevents backflushing liquid from moving from the pulp compression area 48 to areas past the pulp compression area in the first direction (the direction 46).

The ring 53 has an outside diameter 59 (FIG. 5) substantially the same as or slightly less than the inside diameter of the outer perforated screen 51, and an inside diameter 58 substantially the same as or slightly more than the outside diameter of the inner support cylinder 52, so that ring 53 is held in substantially liquid tight engagement between elements 51, 52. The ring 53 typically has a thickness 60 (FIG. 6) of about 0.5–2 inches, preferably 0.5–1.5 inches. While eight openings 57 are illustrated in FIG. 5 the number may vary widely depending upon the particular circumstances (including the diffuser size and design), typically being between about eight and 90.

Figure 6:
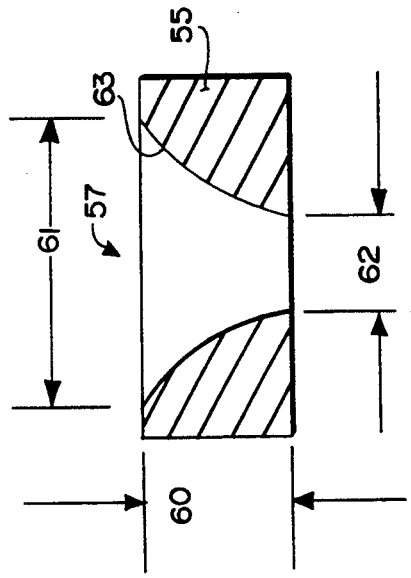
FIG. 6 is a cross-sectional view of the ring of FIG. 5 taken along lines 6—6 thereof.

The rapid-flow restricting openings 57 in the ring comprise fixed or adjustable: rounded surface orifices (FIG. 6), bevel edged orifices (FIG. 8), sharp-edged orifices (FIG. 7), slots, openings with check valves allowing flow only in the second direction and one or more adjacent bleed orifices (FIG. 9), or combinations thereof. Typically, at least some of the rapid-flow restricting openings 57 comprise fixed rounded surface orifices as seen in FIG. 6, having a first end with a diameter 61 of about 0.5–8 (preferably 2–4) inches and a second end 62, downstream of the first end in the second direction, of about 0.5–3 (preferably 0.5–1.5) inches, with a smooth and curved wall 63 therebetween.

Figure 7:
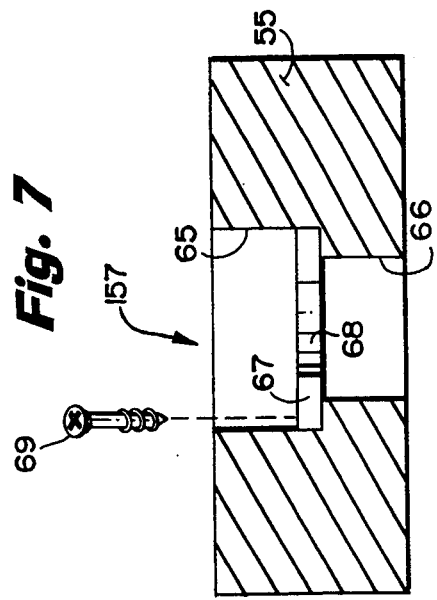

The opening 157 of the FIG. 7 embodiment comprises a sharp edged orifice which—in the exemplary embodiment illustrated —may comprise first and second diameter sidewalls 65, 66 of a generally circular cross-section bore, with the sharp-edged orifice plate 67 having the central opening 68 therein either removably or permanently held in place on a ring formed by the body 55 at the interface between different diameter opening portions 65, 66. In FIG. 7 the plate 67 is shown as removable, as by removing one or more removable fasteners (e.g. screws) 69 holding the plate 67 in place. In this way the openings 157 are adjustable, a different sized opening 68 being provided merely by replacing plates 67.

Figure 8:
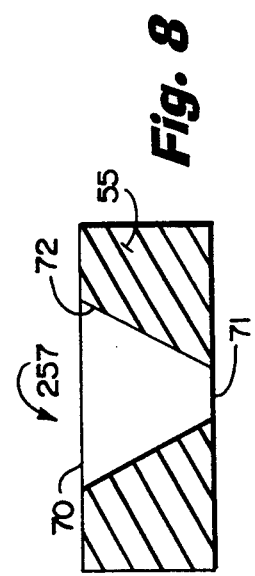

FIG. 8 illustrates an embodiment in which the opening 257 is a beveled-edge orifice, i.e. having a large top opening 70 and much smaller bottom opening 71 (e.g. with the same proportions as the diameters 61, 62) with a beveled edge 72 (e.g. conical surface) therebetween.

Figure 9:
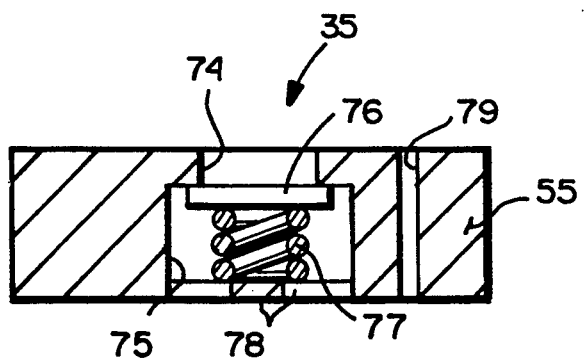
FIGS. 7–9 are views like that of FIG. 6 for different configurations of ring rapid-flow restricting openings according to the present invention.

FIG. 9 illustrates a rapid-flow restricting opening 357 including a smaller diameter bore 74 in the top thereof, and a larger diameter bore 75 open to the bottom, with a check valve element 76 biased by a small spring coefficient coil spring 77 into contact with the bottom ledge of the body 55 at the interface between the bores 74, 75. A spider 78 (most of the area thereof being open) supports the spring 77 opposite the valve element 76. A bleed bore or orifice 79 is disposed adjacent the opening 357.

While a number of different embodiments of the rapid flow restricting openings 57, 157, 257, 357 are illustrated in the drawings, any structure may be utilized which performs the same function. All of the openings 57, 157, etc. prevent fast movement of backflushing liquid from the bottom to the top thereof (that is from adjacent pulp inlet 11 toward the pulp outlet 12), as occurs during a rapid downstroke of the screen assembly 39—yet allow slow movement (as occurs during slow movement of the screen assembly) during withdrawal of screened liquid through the cylinder 51.

It is desirable to combine both aspects of the invention, i.e., the diffuser 10' of FIGS. 4–9 is used with the rest of the pressure diffuser assembly components illustrated in FIG. 1.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. A pressure diffuser assembly, comprising:
   a superatmospheric pressure vessel elongated in a dimension of elongation, and having an inner wall, an inlet and an outlet for pulp, an outlet for withdrawn liquid, and a plurality of inlets for treatment liquid along said dimension of elongation thereof;
   a screen assembly mounted within said vessel and defining a pulp flow annulus between an exterior surface thereof and said inner vessel wall, pulp flowing from said inlet to said outlet through the annulus generally in a first direction along said dimension of elongation, and defining an interior withdrawn liquid volume communicating with said outlet for withdrawn liquid;
   means for moving the screen assembly for slow movement in the first direction along said dimension of elongation, and for rapid, backflushing, movement in a second direction, opposite the first direction, rapid movement in said second direction causing pulp compression adjacent the pulp inlet; and
   means for providing continued substantially constant volume flow of treatment liquid through said inlets for treatment liquid, including treatment liquid inlets adjacent said pulp inlet, despite compression of the pulp caused by rapid movement of said screen assembly in said second direction.

2. A pressure diffuser assembly as recited in claim 1 further comprising a plurality of sets of horizontal treatment liquid conduits connected to said inlets along said dimension of elongation, and at least one vertical header connected to said conduits, and a flow control assembly for said header; and wherein said means for providing continued substantially constant volume flow of treatment liquid through said inlets comprises at least two headers including a first vertical header and flow control assembly for one or more sets of horizontal treatment liquid conduits adjacent said pulp inlet, and a second vertical header and flow control assembly for one or more horizontal treatment liquid conduits remote from said pulp inlet.

3. A pressure diffuser assembly as recited in claim 2 wherein said first and second vertical headers comprise a common pipe with a flow preventer precluding flow between them.

4. A pressure diffuser assembly as recited in claim 2 wherein said first and second vertical headers comprises distinct pipes supplied with treatment liquid by a common pump.

5. A pressure diffuser assembly as recited in claim 2 wherein each of said flow control assemblies comprises a flow element operatively connected to a flow control valve.

6. A pressure diffuser assembly as recited in claim 2 wherein each of said first and second headers comprises at least two branches spaced circumferentially around said superatmospheric pressure vessel.

7. A pressure diffuser assembly as recited in claim 2 further comprising a common pump for supplying treatment liquid to said first and second vertical headers.

8. A method of operating a pressure diffuser assembly for treating cellulosic pulp with a treatment liquid, the assembly including: a superatmospheric pressure vessel elongated in a dimension of elongation, and having an inner wall, an inlet and an outlet for pulp, an outlet for withdrawn liquid, and a plurality of inlets for treatment liquid along the dimension of elongation thereof; a screen assembly mounted within said vessel and defining a pulp flow annulus between an exterior surface thereof and said inner vessel wall, pulp flowing from said inlet to said outlet through said annulus generally in a first direction along said dimension of elongation, and defining an interior withdrawn liquid volume communicating with said outlet for withdrawn liquid; and means for moving said screen assembly for slow movement in said first direction along said dimension of elongation, and for rapid, backflushing, movement in a second direction, opposite said first direction, rapid movement in said second direction causing pulp compression adjacent said pulp inlet;

said method comprising the step of (a) providing continued substantially constant volume flow of treatment liquid through said inlets for treatment liquid, including treatment liquid inlets adjacent said pulp inlet, despite compression of the pulp caused by rapid movement of said screen assembly in said second direction.

9. A method as recited in claim 8 wherein the assembly further comprises a plurality of sets of horizontal treatment liquid conduits connected to said inlets along said dimension of elongation; at least two headers, including a first vertical header and flow control assembly for one or more sets of horizontal treatment liquid conduits adjacent said pulp inlet, and a second vertical header and flow control assembly for one or more horizontal treatment liquid conduits remote from said pulp inlet; and wherein step (a) is practiced by supplying treatment liquid to both the first and second vertical headers, separately controlled by the flow control assemblies associated therewith.

10. A method as recited in claim 9 comprising the further step (b) of distributing liquid from a common pump to said flow control assemblies associated with the first and second vertical headers, steps (a) and (b) preventing undesired thickening of pulp adjacent said pulp inlet.

11. A pressure diffuser assembly, comprising:
a superatmospheric pressure vessel elongated in a dimension of elongation, and having an inner wall, an inlet and an outlet for pulp, an outlet for withdrawn liquid, and a plurality of inlets for treatment liquid along the dimension of elongation thereof;
a screen assembly mounted within said vessel and defining a pulp flow annulus between an exterior surface thereof and said inner vessel wall, pulp flowing from said inlet to said outlet through said annulus generally in a first direction along said dimension of elongation, and defining an interior withdrawn liquid volume communicating with said outlet for withdrawn liquid;
said screen assembly including an outer perforated screen and a concentric inner screen support cylinder radially spaced from said outer perforated screen;
means for moving said screen assembly for slow movement in said first direction along said dimension of elongation, and for rapid, backflushing, movement in a second direction, opposite said first direction, rapid movement in said second direction causing pulp compression in a pulp compression area adjacent said pulp inlet and tending to cause backflushing of withdrawn liquid from said screen assembly adjacent said pulp inlet through a portion of said screen assembly past said pulp compression area in said first direction; and
at least one ring mounted between said outer perforated screen and said concentric inner screen support cylinder and having a plurality of rapid-flow restricting openings therein.

12. A pressure diffuser assembly as recited in claim 11 wherein said at least one ring with flow restricting openings substantially prevents backflushing liquid from moving from said pulp compression area to areas past said pulp compression area in said first direction.

13. A pressure diffuser assembly as recited in claim 12 wherein each said ring comprises a plurality of generally semi-circular ring segments mounted together in substantially liquid tight relationship.

14. A pressure diffuser assembly as recited in claim 13 wherein each said ring has an outside diameter substantially the same as or slightly less than the inside diameter of said outer perforated screen, and an inside diameter substantially the same as or slightly more than the outside diameter of said inner support cylinder, so that said ring is held in liquid tight engagement between said outer perforated screen and said inner support cylinder.

15. A pressure diffuser assembly as recited in claim 12 wherein said rapid-flow restricting openings in said ring comprise fixed or adjustable: rounded surface orifices, bevel edged orifices, slots, sharp-edged orifices, openings with check valves allowing flow only in said second direction and one or more adjacent bleed orifices, or combinations thereof.

16. A pressure diffuser assembly as recited in claim 12 wherein said ring has between about 8–90 rapid-flow restricting openings and a thickness of about 0.5–2 inches.

17. A pressure diffuser assembly as recited in claim 16 wherein at least some of said rapid-flow restricting openings comprise fixed rounded surface orifices having a first end with a diameter of about 1–8 inches and a second end, opposite said first end in said second direction, of about 0.5–3 inches, with a smooth and curved wall therebetween.

18. A pressure diffuser assembly as recited in claim 11 further comprising means for providing continued substantially constant volume flow of treatment liquid through said inlets for treatment liquid, including treatment liquid inlets adjacent said pulp inlet, despite compression of the pulp caused by rapid movement of said screen assembly in said second direction.

19. A pressure diffuser assembly as recited in claim 18 further comprising a plurality of sets of horizontal treatment liquid conduits connected to said inlets along said dimension of elongation, and at least one vertical header connected to said conduits, and a flow control assembly for said header; and wherein said means for providing continued substantially constant volume flow of treatment liquid through said inlets comprises at least two headers, including a first vertical header and flow control assembly for one or more sets of horizontal treatment liquid conduits adjacent said pulp inlet, and a second vertical header and flow control assembly for one or more horizontal treatment liquid conduits remote from said pulp inlet.

20. A pressure diffuser assembly as recited in claim 19 wherein said first and second vertical headers comprise a common pipe with a flow preventer precluding flow between them; and wherein each of said flow control assemblies comprises a flow element operatively connected to a flow control valve.

* * * * *